(12) United States Patent
Jaber

(10) Patent No.: US 6,665,800 B1
(45) Date of Patent: Dec. 16, 2003

(54) SYSTEM AND METHOD FOR SECURING A COMPUTER SYSTEM

(75) Inventor: Muhammed Jaber, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,735

(22) Filed: Jan. 26, 1999

(51) Int. Cl.$^7$ ................................. H04L 9/32
(52) U.S. Cl. ..................................... 713/202
(58) Field of Search ................. 713/200, 201, 713/202, 182, 183, 184, 185, 155, 165, 193; 709/223, 225, 228; 705/64, 72, 41, 44, 67; 902/25, 26; 283/72; 235/300, 382; 340/5.1, 5.2, 5.54, 5.85, 5.8, 5.81; 345/741; 725/30; 711/163, 164; 379/142.05

(56) References Cited

U.S. PATENT DOCUMENTS

| | | | | |
|---|---|---|---|---|
| 4,453,074 A | * | 6/1984 | Weistein | 705/66 |
| 4,757,543 A | | 7/1988 | Tamada et al. | |
| 4,907,268 A | * | 3/1990 | Bosen et al. | 713/193 |
| 5,060,263 A | * | 10/1991 | Bosen et al. | 713/184 |
| 5,097,505 A | | 3/1992 | Weiss | |
| 5,163,098 A | | 11/1992 | Pegg | |
| 5,233,658 A | | 8/1993 | Bianco et al. | |
| 5,375,243 A | * | 12/1994 | Parzych et al. | 713/202 |
| 5,450,491 A | | 9/1995 | McNair | |
| 5,455,941 A | * | 10/1995 | Okuno et al. | 707/9 |
| 5,488,660 A | | 1/1996 | Dawson et al. | |
| 5,495,411 A | * | 2/1996 | Ananda | 364/401 |
| 5,524,072 A | | 6/1996 | Labaton et al. | |
| 5,537,544 A | * | 7/1996 | Morisawa et al. | 713/202 |
| 5,548,645 A | * | 8/1996 | Ananda | 380/4 |
| 5,586,301 A | | 12/1996 | Fisherman et al. | |
| 5,588,056 A | * | 12/1996 | Ganesan | 380/4 |
| 5,612,683 A | | 3/1997 | Trempala et al. | |
| 5,638,513 A | * | 6/1997 | Ananda | 713/202 |
| 5,661,807 A | * | 8/1997 | Guski et al. | 380/25 |
| 5,668,876 A | | 9/1997 | Falk et al. | |
| 5,737,525 A | * | 4/1998 | Picazo, Jr. et al. | 709/249 |
| 5,742,684 A | | 4/1998 | Labaton et al. | |
| 5,771,291 A | | 6/1998 | Newton et al. | |
| 5,771,349 A | * | 6/1998 | Picazo, Jr. et al. | 713/202 |
| 5,812,764 A | * | 9/1998 | Heinz, Sr. | 713/202 |
| 5,857,024 A | * | 1/1999 | Nishino et al. | 380/25 |
| 5,931,948 A | * | 8/1999 | Morisawa et al. | 713/202 |
| 6,061,799 A | * | 5/2000 | Eldridge et al. | 713/202 |
| 6,067,621 A | * | 5/2000 | Yu et al. | 713/172 |
| 6,112,187 A | * | 8/2000 | Fukawa | 705/18 |
| 6,141,760 A | * | 10/2000 | Abadi et al. | 713/202 |
| 6,219,421 B1 | * | 4/2001 | Backal | 380/28 |
| 6,225,889 B1 | * | 5/2001 | Furuta et al. | 340/426 |
| 6,385,731 B2 | * | 5/2002 | Ananda | 713/202 |
| 2002/0113824 A1 | * | 8/2002 | Myers, Jr. | 345/810 |

FOREIGN PATENT DOCUMENTS

| | | | | |
|---|---|---|---|---|
| GB | 2317983 A | * | 4/1998 | G07F/19/00 |
| JP | 401297927 A | * | 12/1989 | H04L/9/00 |
| WO | WO 97/38878 | * | 4/1996 | B60R/25/04 |

OTHER PUBLICATIONS

Hall et al, "Safeguarding microcomputers and LANs" May 1996, Management Accounting, v77n11, p. 27–36.*
"Password Manager 2.5", Sep. 1, 1999, PC Magazine, courtesy of dialog text search, p. 1.*

* cited by examiner

*Primary Examiner*—Ayaz Sheikh
*Assistant Examiner*—Christopher Revak
(74) *Attorney, Agent, or Firm*—Michael A. Davis, Jr.; Haynes and Boone, LLP

(57) ABSTRACT

A computer system includes circuitry for selecting among first and second parameters in response to a command. The parameters are for use in computing a password. The circuitry is for reading content of the selected parameter from a computer-readable medium and computing the password in response thereto. The password computed in response to content of the first parameter is different from the password computed in response to content of the second parameter. Also, the circuitry is for concealing the password from a user of the computer system.

36 Claims, 2 Drawing Sheets

SYSTEM AND METHOD FOR SECURING A COMPUTER SYSTEM

BACKGROUND

The disclosures herein relate in general to information processing systems and in particular to a system and method for securing operation of a computer system.

In an example personal computer ("PC") system, a human user enters one or more passwords in order to read information from a computer-readable medium of the system, write information to the computer-readable medium, and cause the system to perform various operations such as executing applications software. In that manner, the passwords help to guard against theft of the PC system, especially if the PC system is a laptop computer system. In one example, the passwords include a user password, an administrative password, and a master password.

According to a previous technique, if the user forgets the user password, the user may contact the system's manufacturer to learn the master password. After learning the master password, the user may specify a new user password. Accordingly, it is preferable that the master password be unique to each system.

Such uniqueness may be achieved by computing the master password according to a procedure (e.g. formula, algorithm) that is shared by numerous systems produced by the manufacturer, but which uses a particular system's unique serial number as an operand. Nevertheless, if the serial number is printed on the outside of each system or is otherwise readily published, then security would be compromised if the user learns the procedure, because (upon learning the procedure) the user would be able to read the serial number (and compute the master password) for any system that shares the procedure. Accordingly, a shortcoming of such a previous technique is that (a) employees of the manufacturer may fail to properly maintain confidentiality of the procedure; and (b) a user may reverse engineer the procedure by obtaining master passwords for multiple systems, as for example if the user purchases multiple systems.

Accordingly, a need has arisen for a system and method for securing a computer system, in which various shortcomings of previous techniques are overcome. More particularly, a need has arisen for a system and method for securing a computer system, in which a user is less likely to know a procedure and operand for computing a password. Also, a need has arisen for a system and method for securing a computer system in which, if security of a master password procedure (and its operand) has been compromised by a breach of confidentiality, the negative effect of such compromise is readily addressed and temporary.

SUMMARY

One embodiment, accordingly, provides for a computer system that includes circuitry for selecting among first and second parameters in response to a command. The parameters are for use in computing a password. The circuitry is for reading content of the selected parameter from a computer-readable medium and computing the password in response thereto. The password computed in response to content of the first parameter is different from the password computed in response to content of the second parameter. Also, the circuitry is for concealing the password from a user of the computer system.

A principal advantage of this embodiment is that (a) various shortcomings of previous techniques are overcome, (b) a user is less likely to know a procedure and operand for computing a password, and (c) if security of a master password procedure (and its operand) has been compromised by a breach of confidentiality, the negative effect of such compromise is readily addressed and temporary.

DETAILED DESCRIPTION

Figure 1:
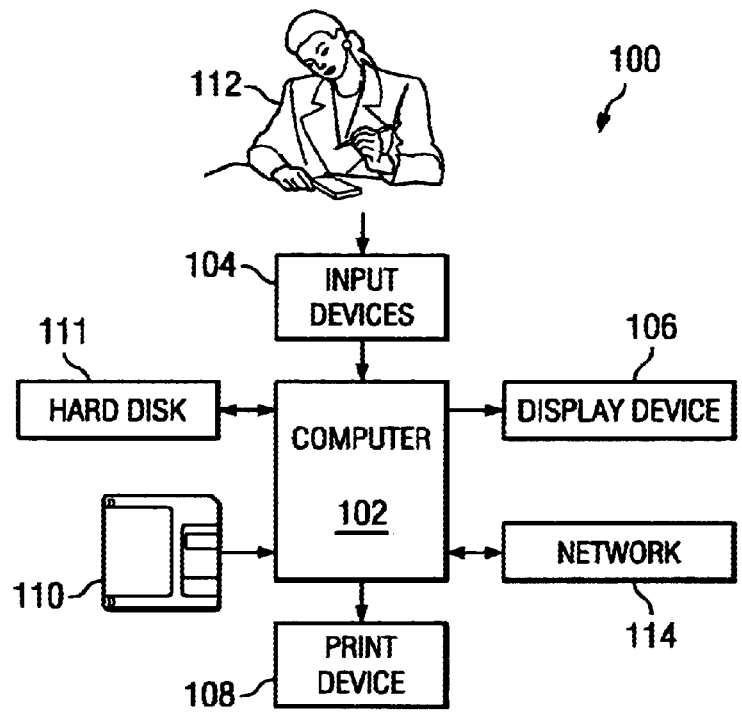
FIG. 1 is a block diagram of a computer system according to the illustrative embodiment.

FIG. 1 is a block diagram of a computer system, indicated generally at 100, according to the illustrative embodiment. System 100 includes input devices 104, a display device 106, a print device 108, and a computer 102 for executing processes and performing operations (e.g. communicating information) in response thereto as discussed further hereinbelow. In the illustrative embodiment, computer 102 is an IBM-compatible personal computer ("PC") that executes Microsoft Windows 95 operating system software. All Microsoft products identified herein are available from Microsoft Corporation, One Microsoft Way, Redmond, Wash. 98052-6399, telephone: (425) 882-8080.

Computer 102 is connected to input devices 104, display device 106 and print device 108. Display device 106 is, for example, a conventional electronic cathode ray tube. Print device 108 is, for example, a conventional electronic printer or plotter. Also, computer 102 includes internal speakers for outputting audio signals. In an alternative embodiment, the speakers are external to computer 102. Moreover, system 100 includes (a) a first computer-readable medium (or apparatus) 110 which is a floppy diskette and (b) a second computer-readable medium (or apparatus) 111 which is a computer hard disk.

A human user 112 and computer 102 operate in association with one another. For example, in response to signals from computer 102, display device 106 displays visual images, and user 112 views such visual images. Also, in response to signals from computer 102, print device 108 prints visual images on paper, and user 112 views such visual images. Further, user 112 operates input devices 104 in order to output information to computer 102, and computer 102 receives such information from input devices 104.

Input devices 104 include, for example, a conventional electronic keyboard and a pointing device such as a conventional electronic "mouse", rollerball or light pen. User 112 operates the keyboard to output alphanumeric text information to computer 102, and computer 102 receives such alphanumeric text information from the keyboard. User 112 operates the pointing device to output cursor-control information to computer 102, and computer 102 receives such cursor-control information from the pointing device.

Computer 102 is structurally and functionally interrelated with each of its connected computer-readable media (e.g.

computer-readable media 110 and 111), as described further hereinbelow. For example, floppy diskette 110 stores (e.g. encodes, records, or embodies) functional descriptive material (e.g. including but not limited to computer programs (also referred to as software or applications) and information structures). Such functional descriptive material imparts functionality when encoded on floppy diskette 110. Also, such functional descriptive material is structurally and functionally interrelated to floppy diskette 110.

Within such functional descriptive material, information structures define structural and functional interrelationships between such information structures and floppy diskette 110 (and other aspects of system 100). Such interrelationships permit the information structures' functionality to be realized. Also, within such functional descriptive material, computer programs define structural and functional interrelationships between such computer programs and floppy diskette 110 (and other aspects of system 100). Such interrelationships permit the computer programs' functionality to be realized.

For example, computer 102 reads (e.g. loads, accesses, or copies) such functional descriptive material into a computer memory device (e.g. random access memory device ("RAM")) of computer 102, and computer 102 performs its operations (as described elsewhere herein) in response to such material which is stored in such memory device. More particularly, computer 102 performs the operation of processing (e.g. executing) a computer application (that is stored, encoded, recorded or embodied on a computer-readable medium) for causing computer 102 to perform additional operations (as described elsewhere herein). Accordingly, such functional descriptive material exhibits a functional interrelationship with the way in which computer 102 executes its processes and performs its operations.

Further, floppy diskette 110 is an apparatus from which the computer application is accessible by computer 102, and the computer application is processable by computer 102 for causing computer 102 to perform such additional operations. In addition to reading such functional descriptive material from floppy diskette 110, computer 102 is capable of reading such functional descriptive material from (or through) a computer network 114 which is another type of computer-readable medium (or apparatus) connected to computer 102. Also, the memory devices (of computer 102) are themselves computer-readable media (or apparatus).

Network 114 includes a network local area network ("LAN") control manager server computer ("LCM"). For communicating with (i.e. outputting information to, and receiving information from) network 114 (including the LCM), computer 102 includes a network interface card ("NIC") which is yet another type of computer-readable medium (or apparatus) connected to computer 102.

Figure 2:
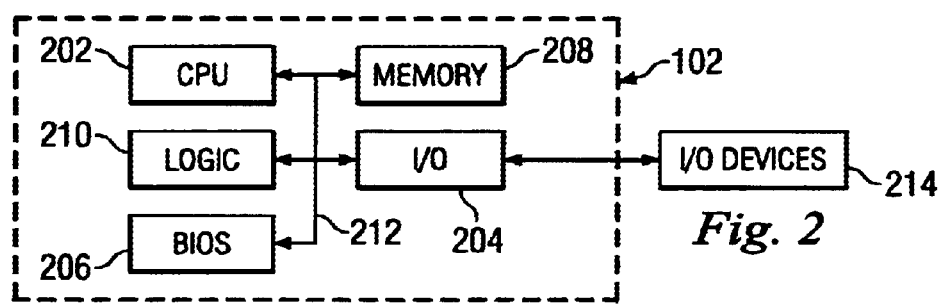
FIG. 2 is a block diagram of a computer of the computer system of FIG. 1.

FIG. 2 is a block diagram of computer 102, which is formed by various electronic circuitry components. Accordingly, as shown in FIG. 2, computer 102 includes a central processing unit ("CPU") 202 for executing and otherwise processing instructions, input/output ("I/O") controller circuitry 204, a basic input output system ("BIOS") electrically erasable programmable read only memory device ("EEPROM") 206 for storing firmware, a memory 208 such as random access memory device ("RAM") and read only memory device ("ROM") for storing information (e.g. instructions executed by CPU 202 and data operated upon by CPU 202 in response to such instructions), and other miscellaneous electronic circuitry logic 210 for performing other operations of computer 102, all coupled to one another through one or more buses 212. Also, computer 102 may include various other components that, for clarity, are not shown in FIG. 2.

As shown in FIG. 2, I/O controller circuitry 204 is coupled to I/O devices 204. I/O devices 214 include, for example, input devices 104, display device 106, print device 108, floppy diskette 110, hard disk 111, and the network interface card ("NIC") discussed hereinabove in connection with FIG. 1. I/O controller circuitry 204 includes controller circuitry (e.g. a microcontroller) for operating I/O devices 214, reading information from I/O devices 216, and writing information to I/O devices 214.

Computer 102 operates its various components (e.g. I/O controller circuitry 204) in response to information stored by BIOS 206. For example, I/O controller circuitry 204 outputs various interrupt requests ("IRQs"), and computer 102 reacts to such IRQs in response to information stored by BIOS 206. Accordingly, by suitably modifying information stored by BIOS 206, one or more components of computer 102 may be effectively disabled, so that computer 102 operates without reference to such components. In such a situation where a component is disabled, computer 102 would not react to an IRQ from such a disabled component, and computer 102 would not allocate resources to such a disabled component.

Figure 3:
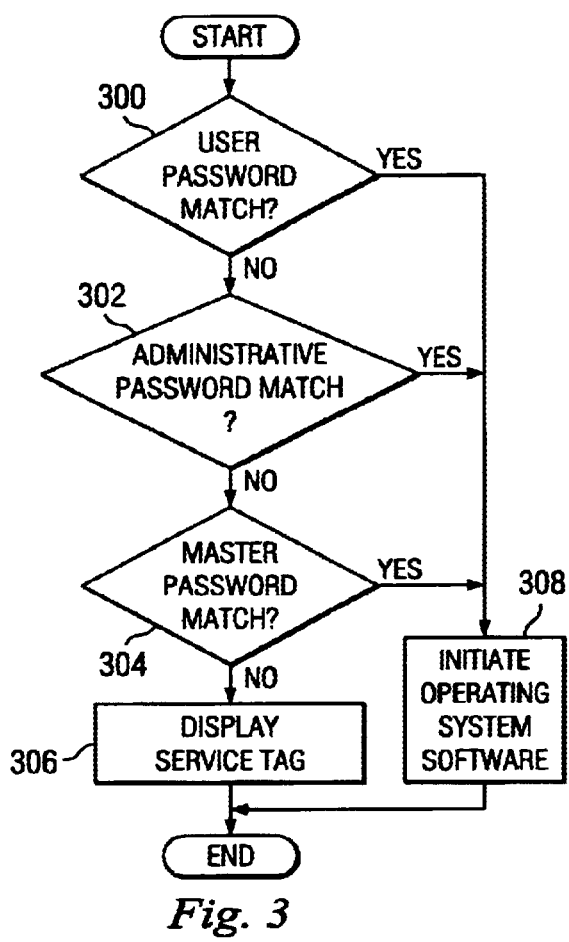
FIG. 3 is a flowchart of operation of the computer of FIG. 2 in securing the computer system of FIG. 1.

FIG. 3 is a flowchart of operation of computer 102 in securing system 100. The operation begins at a step 300, where computer 102 (a) receives a password from user 112 (e.g. as specified by user 112 operating input devices 104), (b) reads a user password that is stored in BIOS 206, and (c) determines whether the received password (from user 112) matches the user password from BIOS 206. If the received password does not match the user password from BIOS 206, the operation continues to a step 302.

At step 302, computer 102 (a) reads an administrative password that is stored in BIOS 206 and (b) determines whether the received password (from user 112) matches the administrative password from BIOS 206. If the received password does not match the administrative password from BIOS 206, the operation continues to a step 304.

At step 304, computer 102 (a) reads content of data that is stored in BIOS 206, (b) reads content of a confidential procedure (specified by the manufacturer of computer 102) that is stored in BIOS 206, (c) computes the master password in response to such content (of such data and such procedure), and (d) determines whether the received password (from user 112) matches the master password. Accordingly, such procedure is a parameter, such data is a parameter, and computer 102 computes the master password in response to such parameters. In the illustrative embodiment, such data is a service tag which includes a serial number of system 100 and which identifies a model number of system 100. If the received password does not match the master password, the operation continues to a step 306 which is discussed further hereinbelow.

At step 306, computer 102 outputs a suitable command to display device 106, so that display device 106 displays the service tag to user 112. In that manner, user 112 may read the service tag from display device 106. Accordingly, when user 112 contacts the manufacturer of computer 102, user 112 may readily communicate the service tag to the manufacturer. In response to such communicated service tag (and, in a significant aspect of the illustrative embodiment, to the version of information stored in BIOS 206), the manufacturer may compute the master password according to the manufacturer's specified confidential procedure.

Conversely, if the received password matches the user password from BIOS 206 at step 300, or the administrative password from BIOS 206 at step 302, or the master password at step 304, the operation continues to a step 308. At step 308, computer 102 initiates operating system software (e.g. Microsoft Windows 95 operating system software) and permits user 112 to read information from computer-readable media of system 100, write information to such computer-readable media, and cause system 100 to perform various operations such as executing applications software.

Figure 4:
FIG. 4 is a conceptual illustration of a master password computation performed by the computer of FIG. 2.
Figure 5:
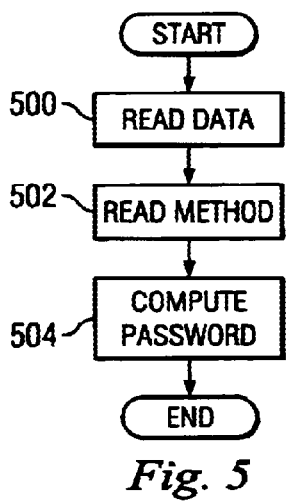
FIG. 5 is a flowchart of the master password computation performed by the computer of FIG. 2.

FIG. 4 is a conceptual illustration of the master password computation, and FIG. 5 is a flowchart of the master password computation performed by computer 102. As shown in FIG. 4, the master password is the result of the procedure, and the procedure uses the unique service tag of computer 102 as an operand. Accordingly, as shown in FIG. 5, computer 102 (a) at a step 500, reads content of data that is stored in BIOS 206, (b) at a step 502, reads content of the confidential procedure (specified by the manufacturer of computer 102) that is stored in BIOS 206, and (c) at a step 504, computes the master password in response to such content (of such data and such procedure), as discussed hereinabove in connection with step 304. In an alternative embodiment, the procedure is stored elsewhere within system 100 (e.g. included within software executed by system 100) instead of in BIOS 206.

Initially, BIOS firmware 206 stores default parameters originally specified by the manufacturer of computer 102. In a significant aspect of the illustrative embodiment, system 100 is operable to change the master password by suitably changing one or more of the parameters stored in BIOS 206. In that manner, system 100 selects among a new parameter and an old parameter in computing the master password. An old parameter stored in BIOS 206 is subject to being changed to (or "replaced by") a new parameter by system 100 in response to suitable instructions executed by CPU 202. For example, CPU 202 reads and executes such instructions as part of BIOS installation utility software for storing a new version of information (e.g. parameters) into BIOS 206.

Such utility software is stored by a computer-readable medium, such as floppy diskette 110, hard disk 111, or the network interface card NIC discussed hereinabove in connection with FIG. 1. Accordingly, CPU 202 reads the BIOS installation utility software from the computer-readable medium. In the illustrative embodiment, CPU 202 reads and executes such instructions of the BIOS installation utility software in response to a command received, directly or indirectly, from user 112. In an alternative embodiment, the command is received from another computer system (e.g. of network 114) instead of user 112.

Figure 6:
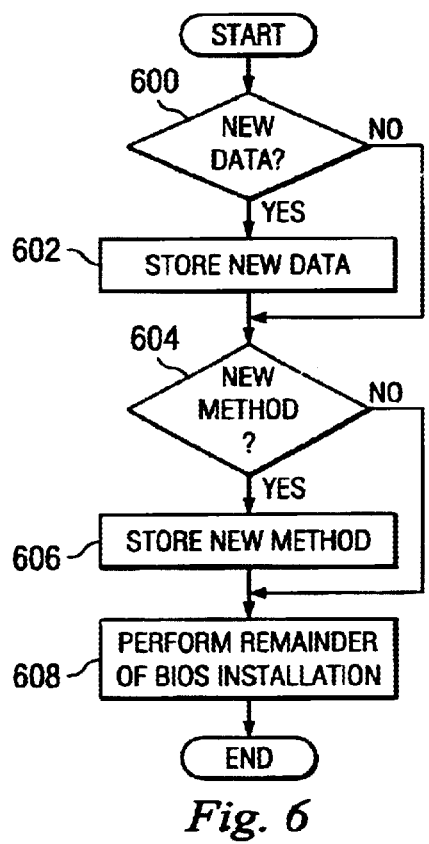
FIG. 6 is a flowchart of operation of the computer system of FIG. 1 in executing instructions of BIOS installation utility software according to the illustrative embodiment.

FIG. 6 is a flowchart of operation of computer 102 in executing such instructions of the BIOS installation utility software according to the illustrative embodiment. At a step 600, computer 102 determines whether the BIOS installation utility software specifies new data for storage in BIOS 206 as an operand for the master password procedure. If so, then computer 102 stores the new data into (i.e. writes the new data to) BIOS 206 at a step 602 in place of the existing operand for the master password procedure. For example, the new data may be a number randomly selected by the manufacturer.

After step 602, or if computer 102 determines at step 600 that the BIOS installation utility software does not specify new data for storage in BIOS 206 as an operand for the master password procedure, the operation continues to a step 604. At step 604, computer 102 determines whether the BIOS installation utility software specifies a new master password procedure for storage in BIOS 206. If so, then computer 102 stores the new procedure into BIOS 206 at a step 606 in place of the existing master password procedure.

After step 606, or if computer 102 determines at step 604 that the BIOS installation utility software does not specify a new master password procedure for storage in BIOS 206, the operation continues to a step 608. At step 608, computer 102 performs the remainder of the BIOS installation, as specified by instructions of the BIOS installation utility software. In the manner of FIG. 6, system 100 changes the master password by suitably changing one or more of the parameters (e.g. the master password procedure and/or data as an operand for the master password procedure) stored in BIOS 206.

In changing a parameter according to the operation of FIG. 6, system 100 does not display the new parameter to user 112, in the same manner that system 100 does not display the old parameter to user 112. Accordingly, in a significant aspect of the illustrative embodiment, contents of the old and new parameters are concealed from user 112. Such concealment is advantageous for enhancing confidentiality of the parameters. In that manner, the BIOS installation utility software has value as a security enhancement for possible purchase by an owner of system 100. For example, even if security of the old master password procedure (and its operand) has been compromised by a breach of confidentiality, the negative effect of such compromise is readily addressed and temporary if system 100 executes instructions of the BIOS installation utility software according to the operation of FIG. 6.

Moreover, in changing a parameter (e.g. in storing a new parameter in place of the existing parameter within BIOS 206) according to the operation of FIG. 6, BIOS 206 may physically continue storing both the old and new parameters. For example, instead of physically deleting or overwriting the old parameter, BIOS 206 may (a) identify the new parameter as being active and (b) identify the old parameter as being inactive. In such a situation, BIOS installation utility software includes software for identifying the active parameter, so that computer 102 computes (in accordance with FIG. 5) the master password in response to reading content of the active "new" parameter instead of the inactive "old" parameter. In that manner, computer 102 selects among the active "new" parameter and the inactive "old" parameter in computing the master password.

In an alternative embodiment, if computer 102 stores a new master password procedure into BIOS 206 at step 606, the new master password procedure is compatible with the old master password procedure that was originally specified (and stored in BIOS firmware 206) by the manufacturer of computer 102. Accordingly, in such an alternative embodiment, if computer 102 computes a certain master password in response to particular data and the old master password procedure, computer 102 computes the same master password in response to the same data and the new master password procedure. Even in such an alternative embodiment, if security of the old master password procedure (and its operand) has been compromised by a breach of confidentiality, the negative effect of such compromise is readily addressed and temporary if system 100 executes instructions of the BIOS installation utility software according to the operation of FIG. 6 in order to store new concealed operand data into BIOS 206 at step 602.

In another alternative embodiment, (a) system 100 is operable to change the master password by suitably changing one or more of the parameters stored in BIOS 206, (b) such parameter stored in BIOS 206 is subject to being changed by system 100 in response to suitable instructions executed by CPU 202, and (c) such instructions themselves are stored in BIOS 206 (which is a computer-readable medium, as discussed hereinabove in connection with FIG. 1). In such an alternative embodiment, CPU 202 reads such instructions from BIOS 206 and executes such instructions in response to a command received, directly or indirectly, from user 112. Even in such an alternative embodiment, the content of the new parameter is concealed from user 112, although the manufacturer of computer 102 knows the content of the new parameter if the manufacturer originally stored such instructions in BIOS 206.

For example, in such an alternative embodiment, user 112 may wish to issue such a command to CPU 202 if user 112 suspects that security of the old master password procedure (and its operand) has been compromised by a breach of confidentiality. In that manner, as in the illustrative embodiment, the negative effect of such compromise is readily addressed and temporary if system 100 executes such instructions according to the operation of FIG. 6. If user 112 forgets the user password and contacts the manufacturer of computer 102 to learn the master password, then user 112 would notify the manufacturer that user 112 has already issued such a parameter-changing command to CPU 202, and the manufacturer would give user 112 the correct master password according to the new parameter (which the manufacturer knows if the manufacturer originally stored the parameter-changing instructions in BIOS 206).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system, comprising:
at least one computer-readable medium; and
a computer means for: in response to a command, selecting among first and second parameters, wherein the parameters are for use in computing a password, and wherein the first and second parameters are respectively first and second procedures for computing the password; reading content of the selected parameter from the computer-readable medium, and computing the password in response thereto, wherein the password computed in response to content of the first parameter is different from the password computed in response to content of the second parameter; and concealing the password from a user of the computer system.

2. The computer system of claim 1 wherein the computer means comprises means for receiving the command from the user.

3. The computer system of claim 1 wherein the computer means comprises means for concealing content of at least the selected parameter from the user.

4. A computer system, comprising:
at least one computer-readable medium; and
a computer means for: in response to a command, selecting among first and second parameters, wherein the parameters are for use in computing a password, and wherein the first and second parameters are respectively first and second operands for computing the password; reading content of the selected parameter from the computer-readable medium, and computing the password in response thereto, wherein the password computed in response to content of the first parameter is different from the password computed in response to content of the second parameter, and concealing the password from a user of the computer system.

5. The computer system of claim 4 wherein the computer means comprises means for concealing content of at least the selected parameter from the user.

6. The computer system of claim 4 wherein the computer means comprises means for receiving the command from the user.

7. A computer system, comprising:
at least one computer-readable medium wherein the computer-readable medium is a basic input output system ("BIOS") memory; and
a computer means for: in response to a command, selecting among first and second parameters, wherein the parameters are for use in computing a password; reading content of the selected parameter from the computer-readable medium, and computing the password in response thereto, wherein the password computed in response to content of the first parameter is different from the password computed in response to content of the second parameter; and concealing the password from a user of the computer system.

8. A computer system, comprising:
at least one computer-readable medium; and
a computer means for: in response to a command, selecting among first and second parameters by identifying the second parameter as being active in the computer-readable medium, wherein the parameters are for use in computing a password; reading content of the selected parameter from the computer-readable medium, and computing the password in response thereto, wherein the password computed in response to content of the first parameter is different from the password computed in response to content of the second parameter; and concealing the password from a user of the computer system.

9. The computer system of claim 8 wherein the computer means comprises means for selecting among the first and second parameters by storing content of the second parameter into the computer-readable medium.

10. The computer system of claim 9 wherein the computer means comprises means for selecting among the first and second parameters by storing content of the second parameter into the computer-readable medium in place of content of the first parameter.

11. The computer system of claim 9 wherein the computer-readable medium is a first computer-readable medium, the computer system includes a second computer-readable medium, and the computer means comprises means for: selecting among the first and second parameters by reading content of the second parameter from the second computer-readable medium, and storing the content of the second parameter into the first computer-readable medium.

12. A computer system, comprising:
a first computer-readable medium;
a second computer-readable medium; and
a computer for:
in response to a command, selecting among first and second parameters, the parameters being for use in computing a password;
reading content of the selected parameter from the first computer-readable medium and computing the password in response thereto, the password computed in response to content of the first parameter being different from the password computed in response to content of the second parameter;

concealing the password from a user of the computer system;

receiving information from the user;

determining whether the information matches the password; and in response to determining the information matches the password, permitting the user to read from and write information to the second computer-readable medium.

13. A method performed by a computer system, the method comprising:

in response to a command, selecting among first and second parameters, the parameters being for use in computing a password, the first and second parameters being respectively first and second procedures for computing the password;

reading content of the selected parameter from a computer-readable medium and computing the password in response thereto, the password computed in response to content of the first parameter being different from the password computed in response to content of the second parameter; and concealing the password from a user of the computer system.

14. The method of claim 13 and comprising:

receiving the command from the user.

15. The method of claim 13 and comprising:

concealing content of at least the selected parameter from the user.

16. A method performed by a computer system, the method comprising:

in response to a command, selecting among first and second parameters, the parameters being for use in computing a password, the first and second parameters being respectively first and second operands for computing the password;

reading content of the selected parameter from a computer-readable medium and computing the password in response thereto, the password computed in response to content of the first parameter being different from the password computed in response to content of the second parameter; and concealing the password from a user of the computer system.

17. The method of claim 16 and comprising:

concealing content of at least the selected parameter from the user.

18. The method of claim 16 and comprising:

receiving the command from the user.

19. A method performed by a computer system, the method comprising:

in response to a command, selecting among first and second parameters, the parameters being for use in computing a password;

reading content of the selected parameter from a computer-readable medium and computing the password in response thereto, the password computed in response to content of the first parameter being different from the password computed in response to content of the second parameter, and the computer-readable medium being a basic input output system ("BIOS") memory; and concealing the password from a user of the computer system.

20. A method performed by a computer system, the method comprising:

in response to a command, selecting among first and second parameters by identifying the second parameter as being active in the computer-readable medium, the parameters being for use in computing a password;

reading content of the selected parameter from a computer-readable medium and computing the password in response thereto, the password computed in response to content of the first parameter being different from the password computed in response to content of the second parameter; and concealing the password from a user of the computer system.

21. The method of claim 20 wherein selecting among the first and second parameters comprises:

selecting among the first and second parameters by storing content of the second parameter into the computer-readable medium.

22. The method of claim 21 wherein selecting among the first and second parameters comprises:

selecting among the first and second parameters by storing content of the second parameter into the computer-readable medium in place of content of the first parameter.

23. The method of claim 21 wherein the computer-readable medium is a first computer-readable medium, and selecting among the first and second parameters comprises:

selecting among the first and second parameters by reading content of the second parameter from a second computer-readable medium and storing the content of the second parameter into the first computer-readable medium.

24. A method performed by a computer system, the method comprising:

in response to a command, selecting among first and second parameters, the parameters being for use in computing a password;

reading content of the selected parameter from a first computer-readable medium and computing the password in response thereto, the password computed in response to content of the first parameter being different from the password computed in response to content of the second parameter;

concealing the password from a user of the computer system;

receiving information from the user;

determining whether the information matches the password; and in response to determining the information matches the password, permitting the user to read from and write information to a second computer-readable medium.

25. A computer program product, comprising:

a computer program processable by a computer system for causing the computer system to:

in response to a command, select among first and second parameters, the parameters being for use in computing a password, wherein the first and second parameters are respectively first and second procedures for computing the password;

read content of the selected parameter from a computer-readable medium and compute the password in response thereto, the password computed in response to content of the first parameter being different from the password computed in response to content of the second parameter; and conceal the password from a user of the computer system; and apparatus on which the computer program is embodied and from which the computer program is accessible by the computer system.

26. The computer program product of claim 25 wherein the computer program is processable by the computer system for causing the computer system to:

receive the command from the user.

27. The computer program product of claim 25 wherein the computer program is processable by the computer system for causing the computer system to:

conceal content of at least the selected parameter from the user.

28. A computer program product, comprising:

a computer program processable by a computer system for causing the computer system to:

in response to a command, select among first and second parameters, the parameters being for use in computing a password, wherein the first and second parameters are respectively first and second operands for computing the password;

read content of the selected parameter from a computer-readable medium and compute the password in response thereto, the password computed in response to content of the first parameter being different from the password computed in response to content of the second parameter; and conceal the password from a user of the computer system; and apparatus on which the computer program is embodied and from which the computer program is accessible by the computer system.

29. The computer program product of claim 28 wherein the computer program is processable by the computer system for causing the computer system to:

conceal content of at least the selected parameter from the user.

30. The computer program product of claim 28 wherein the computer program is processable by the computer system for causing the computer system to:

receive the command from the user.

31. A computer program product, comprising:

a computer program processable by a computer system for causing the computer system to:

in response to a command, select among first and second parameters, the parameters being for use in computing a password;

read content of the selected parameter from a computer-readable medium and compute the password in response thereto, the password computed in response to tent of the first parameter being different from the password computed in response to content of the second parameter, wherein the computer-readable medium is a basic input output system ("BIOS") memory; and conceal the password from a user of the computer system; and apparatus on which the computer program is embodied and from which the computer program is accessible by the computer system.

32. A computer program product, comprising:

a computer program processable by a computer system for causing the computer system to:

in response to a command, select among first and second parameters by identifying the second parameter as being active in the computer-readable medium, the parameters being for use in computing a password;

read content of the selected parameter from a computer-readable medium and compute the password in response thereto, the password computed in response to content of the first parameter being different from the password computed in response to content of the second parameter; and conceal the password from a user of the computer system; and apparatus on which the computer program is embodied and from which the computer program is accessible by the computer system.

33. The computer program product of claim 32 wherein the computer program is processable by the computer system for causing the computer system to:

select among the first and second parameters by storing content of the second parameter into the computer-readable medium.

34. The computer program product of claim 33 wherein the computer program is processable by the computer system for causing the computer system to:

select among the first and second parameters by storing content of the second parameter into the computer-readable medium in place of content of the first parameter.

35. The computer program product of claim 33 wherein the computer-readable medium is a first computer-readable medium, and the computer program is processable by the computer system for causing the computer system to:

select among the first and second parameters by reading content of the second parameter from the second computer-readable medium and storing the content of the second parameter into the first computer-readable medium.

36. A computer program product, comprising:

a computer program processable by a computer system for causing the computer system to:

in response to a command, select among first and second parameters, the parameters being for use in computing a password;

read content of the selected parameter from a first computer-readable medium and compute the password in response thereto, the password computed in response to content of the first parameter being different from the password computed in response to content of the second parameter;

conceal the password from a user of the computer system;

receive information from the user;

determine whether the information matches the password; and in response to determining the information matches the password, permit the user to read from and write information to a second computer-readable medium; and apparatus on which the computer program is embodied and from which the computer program is accessible by the computer system.

* * * * *